US005276968A

United States Patent [19]
Collins et al.

[11] Patent Number: 5,276,968
[45] Date of Patent: Jan. 11, 1994

[54] APPARATUS FOR CUTTING VEGETATION

[75] Inventors: Imack L. Collins, Shreveport, La.; Jerry E. Stuart, Des Plaines, Ill.; Gary H. Foster, Austin, Tex.

[73] Assignee: White Consolidated Industries, Inc., Cleveland, Ohio

[21] Appl. No.: 609,030

[22] Filed: Oct. 31, 1990

Related U.S. Application Data

[60] Continuation of Ser. No. 295,448, Jan. 10, 1989, abandoned, which is a division of Ser. No. 908,214, Sep. 17, 1986, Pat. No. 4,835,867, which is a continuation-in-part of Ser. No. 631,000, Jul. 16, 1984, Pat. No. 4,852,258, which is a continuation of Ser. No. 245,459, Mar. 19, 1981, abandoned, which is a continuation of Ser. No. 891,666, Mar. 30, 1978, abandoned.

[51] Int. Cl.⁵ .............................................. A01D 50/00
[52] U.S. Cl. ............................................. 30/276; 30/347
[58] Field of Search ............................................. 30/276, 347

[56] References Cited

U.S. PATENT DOCUMENTS

| | | | |
|---|---|---|---|
| 4,097,991 | 7/1978 | Proulx | 30/276 |
| 4,104,796 | 8/1978 | Sheldon | 30/276 |
| 4,167,812 | 9/1979 | Moore | 30/276 |
| 4,244,103 | 1/1981 | Snarr | 30/276 |
| 4,285,127 | 8/1981 | Zerrer et al. | 30/276 |
| 4,366,621 | 1/1983 | Mitchell | 30/276 |
| 4,493,151 | 1/1985 | Mitchell | 30/276 |
| 4,660,286 | 4/1987 | Engelbrecht et al. | 30/276 |

*Primary Examiner*—Douglas D. Watts
*Attorney, Agent, or Firm*—Hubbard, Thurman, Tucker & Harris

[57] ABSTRACT

Apparatus for cutting vegetation with a rotatable head carrying a non-metallic cutting line extended into a cutting plane. As the line extension decreases from an established preset length an actuator in the head permits additional line to be extended automatically from a supply source within the head. The actuator imposes a back pressure against the line of magnitude correlated to the sensed pull tension wanting to extend the line outward of the head. After the cutting line length is extended to its restored original preset length, the actuator in response to the operational forces imposed thereon secures the cutting line against further extension until a subsequent decrease in line extension is incurred. In one embodiment an inertial drag brake is activated during the course of line feedout and is deactivated after the length of cutting line has been fully restored.

7 Claims, 8 Drawing Sheets

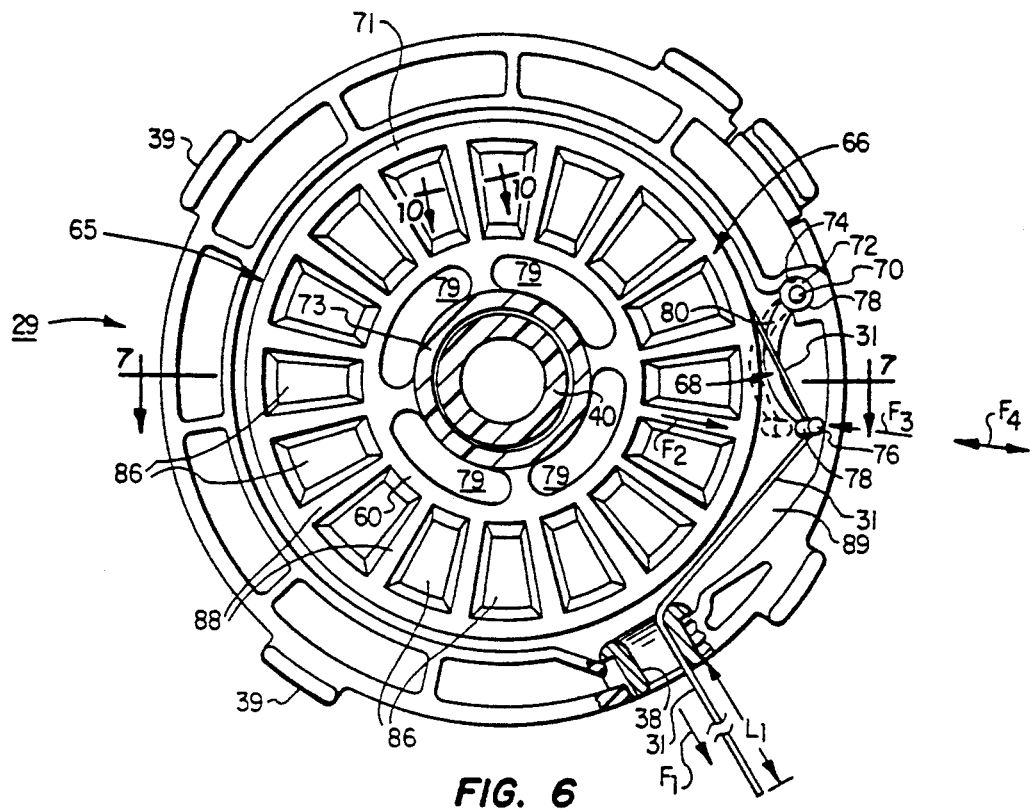
FIG. 6
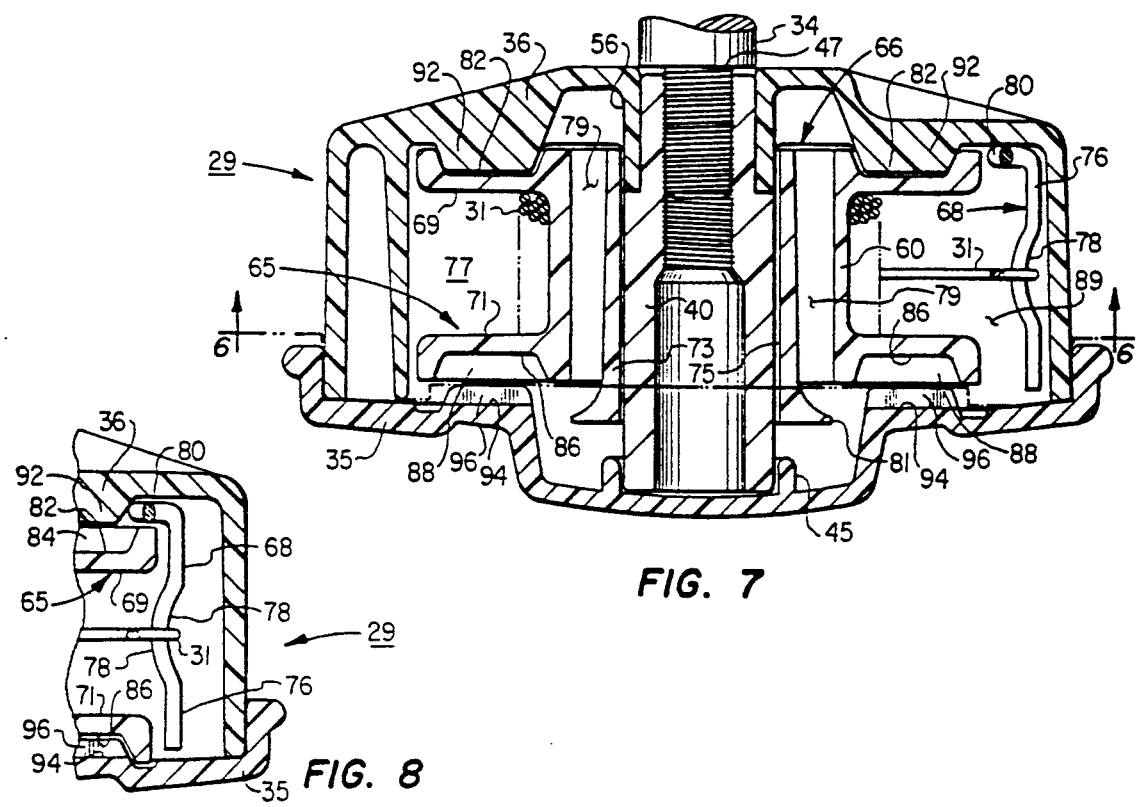
FIG. 7
FIG. 8

APPARATUS FOR CUTTING VEGETATION

This application is a continuation, of application Ser. No. 295,448, filed Jan. 10, 1989, now abandoned, which is a division of application Ser. No. 908,214, filed Sep. 17, 1986, now U.S. Pat. No. 4,815,867, which application is a continuation-in-part of application Ser. No. 631,000 filed Jul. 16, 1984, now U.S. Pat. No. 4,852,258, which is a continuation of abandoned application Ser. No. 245,459 filed Mar. 19, 1981 which is a continuation of application Ser. No. 891,666 filed Mar. 30, 1978, now abandoned.

TECHNICAL FIELD

The field of art to which the invention relates includes apparatus for the cutting of vegetation, and more particularly to the cutting of vegetation using a flexible, non-metallic cutting line extending from a rotating head into a cutting plane.

BACKGROUND OF THE INVENTION

Various types of devices have been proposed to facilitate the removal of vegetation by mowing, trimming, edging and like cutting operations. In general, these devices have employed a metal blade to effect vegetation removal. Devices of this nature employ prime movers such as electric and gasoline motors. As a result, rotating metal blades can inflict serious and terrible injury upon the user.

In about 1960, there was developed in Europe a trimmer/edger unit employing a flexible polymeric line extending from a rotating head for cutting vegetation. This unit did not work properly because of several defects in structure and operating parameters. In the United States of America, practical vegetation cutting devices using flexible, non-metallic lines carried upon a rotating head were developed. The devices are shown in U.S. Pat. Nos. 3,708,967, 3,826,068, 3,859,776, 4,035,912, 4,052,789, 4,054,992 and 4,067,108. These patented devices have met with outstanding success in that these American developments provide safe electrical or gasoline-powered tools for vegetation cutting, edging and trimming operations.

The devices shown in the mentioned patents employ a flexible cutting line, such as manufactured from Nylon polymer. The cutting line is carried usually upon a spool internally of a rotating head. When desired to replenish the line or to extend an additional length of line, the rotation of the head was stopped and line manually extended from the spool. This line extension procedure in the patented devices has been found to be convenient, simple and reliable. In many of the more powerful devices, especially those powered by electric motors, a system to extend the cutting line from the head without interrupting cutting operations has long been sought.

A most desirable system would be one capable of feeding cutting line from the head automatically as need was incurred independent of any operator involvement. Structures directed toward this purpose are shown in U.S. Pat. Nos. 3,895,440, 4,020,550 and 4,035,915. These structures have, in common, a basket weave supply of cutting line carried on the periphery of a disc with the line feeding from behind special post members. These post members have a cutting-abrading edge so that cutting line from the weave supply is bent about such edge in the free traveling end portion extending into the cutting plane. The combination function of the edge, line, angular speed, etc. is arranged so that the line posts with such edge sever the free end of the cutting line when it is worn to an ineffective length. In practice, these structures are found to waste about 25 percent of the cutting line because of the excessive length of line severed at the posts' edge, e.g., 3 inches.

SUMMARY OF THE INVENTION

The present invention provides a rotating head with a mechanism that extends the cutting line to a suitable operating length whenever it is worn or severed to an undesirable lesser length without interrupting vegetation cutting or requiring independently imposed operator involvement.

In accordance with this invention, there is provided an apparatus for cutting vegetation which has a head rotatable about an axis of rotation. The head includes a cavity containing a supply of a flexible non-metallic cutting line that extends outwardly from the head through an aperture into a cutting plane. The pull on the line extending from the head into the cutting plane resulting from centrifugal force is balanced against the centrifugal force acting on a fixed or reference counterweight and the payout of replacement line is controlled by a mechanism responding to the imbalanced centrifugal forces. When no centrifugal force is present, i.e., the head is not rotating, line payout is prevented. When the reference force exceeds the line pull force, i.e., the head is rotating and the line is shorter than the desired length, the line is released for further payout. When the line pull force exceeds the reference force, i.e., the line is at the desired length or greater, additional line payout is prevented. If the head is rotating and the pull on the line subsequently falls below the counterbalance or reference force, i.e., the line is shorter than the desired cutting length, the line is again payed out until the desired length is attained. Any event which artificially increases the line pull, such as snagging of the line on a fence or the like, further overbalances the reference force, ensuring that no line is paid out. Thus, the only condition which allows line to extend is a shortening of the line. Since line is released only in response to a centrifugally generated force produced by rotation, the line cannot be extended during start-up. Because the system relies only on counterbalancing centrifugal forces, not spring forces, it is independent of rotational speed or direction of the head, making it suitable for use on both gasoline engines, and electric motor driven devices. Of course, as the line shortens, due to wear, there is a tendency to increase the rotational speed of the head, which increases the centrifugal force of the line and the reference mass as a square function.

In another embodiment, the imbalanced force is used to secure a spool upon which the line is wound against rotation, and thus prevent further payout.

In one embodiment of the invention, the imbalanced force is used to directly frictionally engage the line through a lever arrangement to prevent further line payout.

In accordance with a very important aspect of the invention, stability of operation is achieved by providing an enhanced, predictable drag force on the line as it is payed out to maintain full tension on the line at all times, thus ensuring that the centrifugal force on the line can be accurately sensed during all modes of operation. This may be considered as a controlled payout in which the rate of payout is limited so that at all stages during payout, a back tension substantially equal to the centrifugal force on the line is applied to the line as the line is payed out. Otherwise the line has no tension and the centrifugal force cannot be measured by sensing the tension in the line and using this measured force to terminate line payout.

In one specific embodiment of the invention a pivotally supported arm about which the cutting line is strung has an imbalanced mass and acts in cooperation with a relatively fixed surface to frictionally secure the cutting line against payout when the free end of the line is at a predetermined length, and to slidably release the cutting line for extension into the cutting plane when the length of the free end is decreased.

In second and third embodiments, a pivotally supported balancing arm is imbalanced to form a reference mass which is responsive to the centrifugal forces of rotation. The arm effects engagement and disengagement of a drag mechanism which functions to impose a controlled backtension on the line for resisting uncontrolled extension of the line to both ensure that the tension in the line can be sensed at all times and to slow the rate of payout until the mechanism can properly lock the line against further extension at the desired length.

A still more specific aspect of the invention includes a spool within the head upon which the line is wound. A cam tooth arrangement forces the spool to reciprocate axially in response to centrifugal pull on the line. The force required to cause the spool to reverse directions provides a resistance to line payout which maintains full tension on the line. This allows the centrifugal force on the line to be sensed by the balance arm, and also slows the payout to enable the mechanism time to respond and stop the line at the appropriate length before excess line has payed out.

In one specific embodiment, the balance arm locks axial reciprocation of the spool, and thus rotation of the spool, to prevent line payout.

In another specific embodiment, the balance beam engages teeth formed on the periphery of the spool to directly prevent rotation of the spool.

In still another embodiment of the invention, a highly leveraged imbalanced pivot arm is used to pinch or grip the line. In this embodiment, the line is passed around a friction surface prior to passing over the pivot arm to ensure a minimum, controlled back pressure which is sufficient to ensure that the highly leveraged pivot arm, which functions as a force amplifier, will exert a frictional, sliding force to control payout by maintaining a sufficient lock tension on the line to overbalance the reference force when the line has reached the desired length so that the line can be locked.

BRIEF DESCRIPTION OF THE DRAWINGS

FIG. 6 is a cross-sectional view through the cutting head of another embodiment of the present apparatus taken along line 6—6 of FIG. 7;

FIG. 7 is a cross-sectional view through the cutting head taken along line 7—7 of FIG. 6;

FIG. 8 is a fragmentary view of a right hand portion of FIG. 7 illustrating a changed relative orientation of the components;

Referring to FIG. 1, there is shown an apparatus for cutting vegetation constructed in accordance with the present invention. For purposes of description the apparatus comprises a grass trimmer 21, but could be a lawnmower, edger or other device for vegetation cutting purposes. The trimmer 21 has a lower housing 22 interconnected by a tube 23 to a handle assembly 24. The assembly 24 provides a switch 26 for selectively applying electrical power received by a cord 27 to an electrical motor carried within the housing 22. For two-handed operation of the trimmer 21, an auxiliary handle 28 is provided upon the tube 23. The lower housing 22 carries a head 29 rotatable about an axis passing through the housing 22 and the cutting line 31 extends into a cutting plane which is substantially perpendicular to the axis of rotation of the head.

In FIG. 2, there is shown an enlargement of the housing 22 carrying a plurality of air induction openings 32 for introducing a flow of cooling air over a motor 33 contained in the housing 22. The motor 33 has a downwardly-extending drive shaft 34 to which the head 29 is threadedly connected. The upper surface of the head 29 may be surrounded by a plurality of vanes 37 serving as a centrifugal blower for moving air radially outwardly from the head 29 during its rotation. As a result, the induced flow of air cools the motor 33 within the housing 22.

Figure 1:
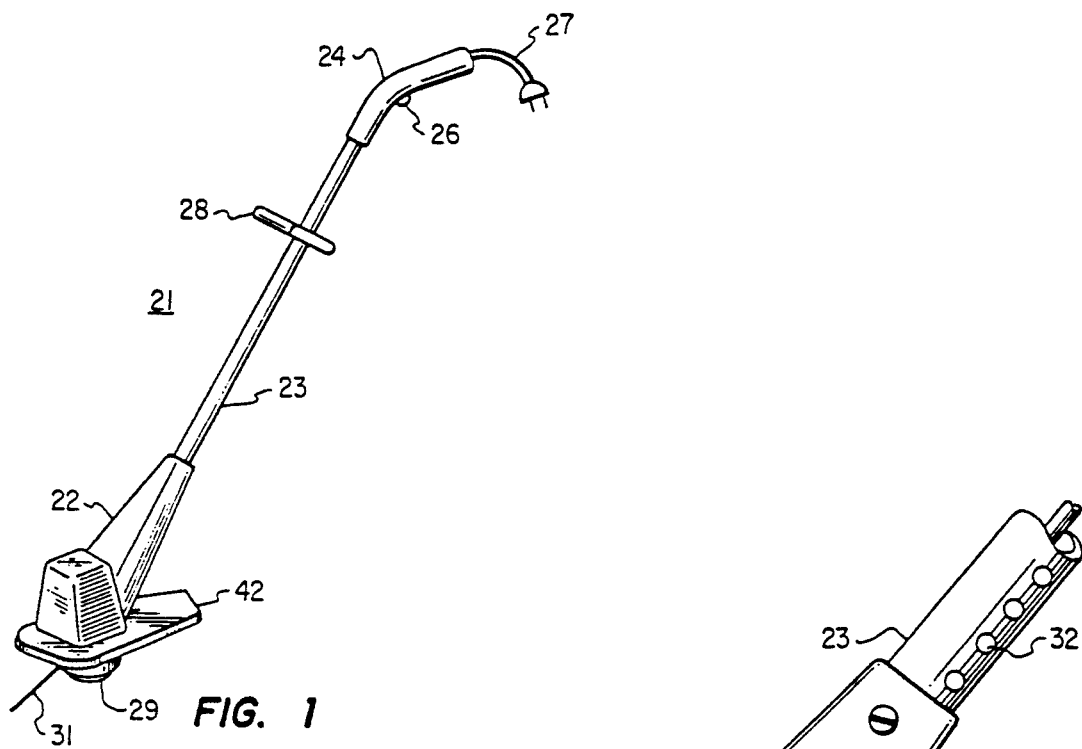
FIG. 1 is a pictorial view illustrating an electric motor driven embodiment of the apparatus for cutting vegetation arranged according to the present invention.
Figure 2:
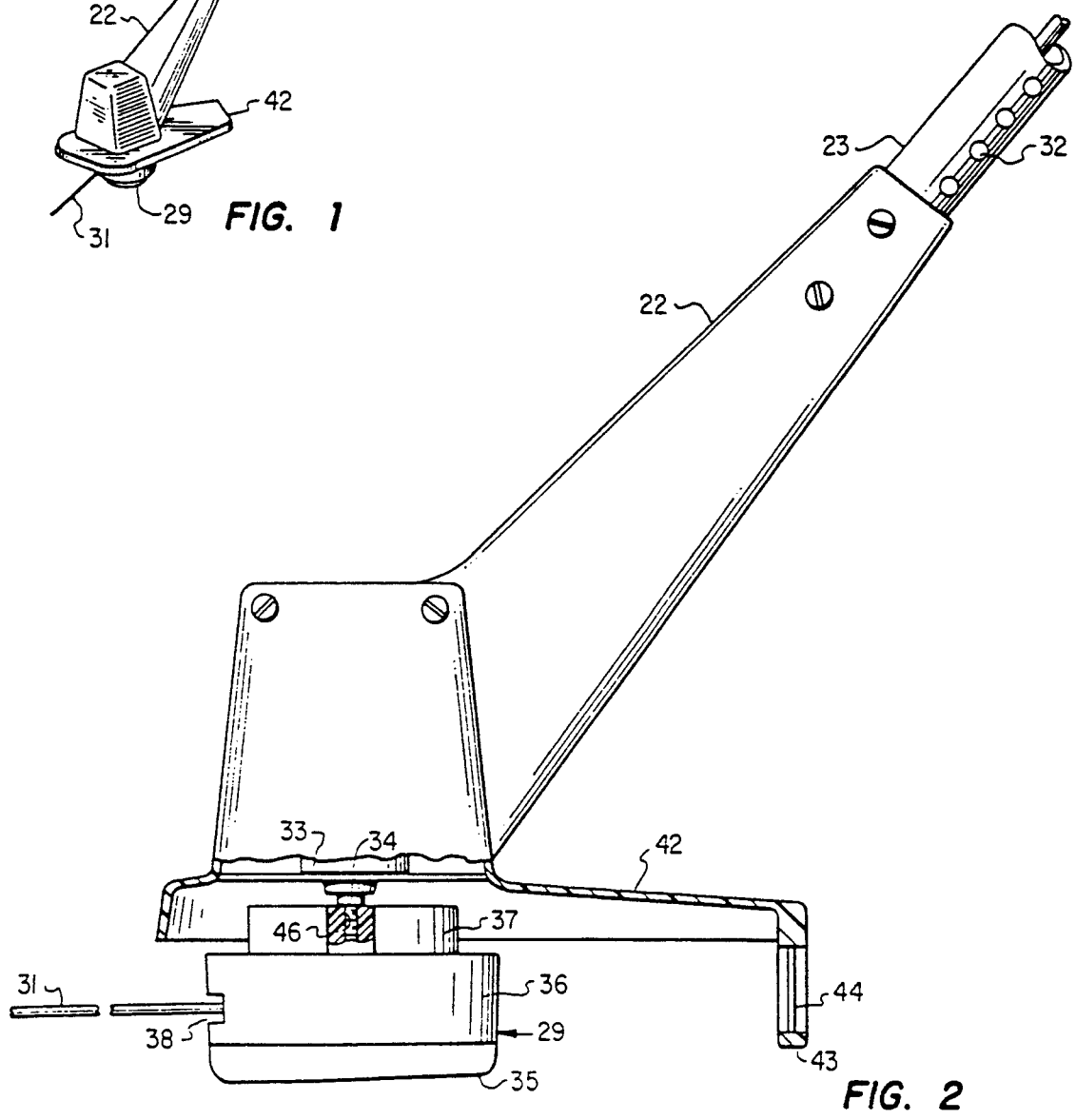
FIG. 2 illustrates, in enlargement and partially broken away, the lower portion of the apparatus shown in FIG. 1.

Comprising head 29 is a hub 36 and a bottom cover 35, the former of which carries in its side peripheral surface an aperture 38 through which the cutting line 31 extends radially outward into the cutting plane. A smooth bearing surface at the aperture protects the line 31 against undue wear and breakages. The cover 35 is releasably secured to the hub 36 by a threaded connection.

The housing 22 includes a rearwardly-extending tail part 42 which serves as a protection to the user to prevent inadvertent contact with the rotating cutting line 31. Also, the tail part provides an automatic limit to the extension of the cutting line 31 from the head 29. More particularly, the tail part 42 has a downwardly-extending projection 43 in which is embedded a metal cutting blade 44. As a result, the cutting line 31 when rotated in a cutting plane by the head 29 can never have an operating length extending beyond the cutting blade 44. Any initially greater length of cutting line is automatically severed by the blade 44.

Figure 3:
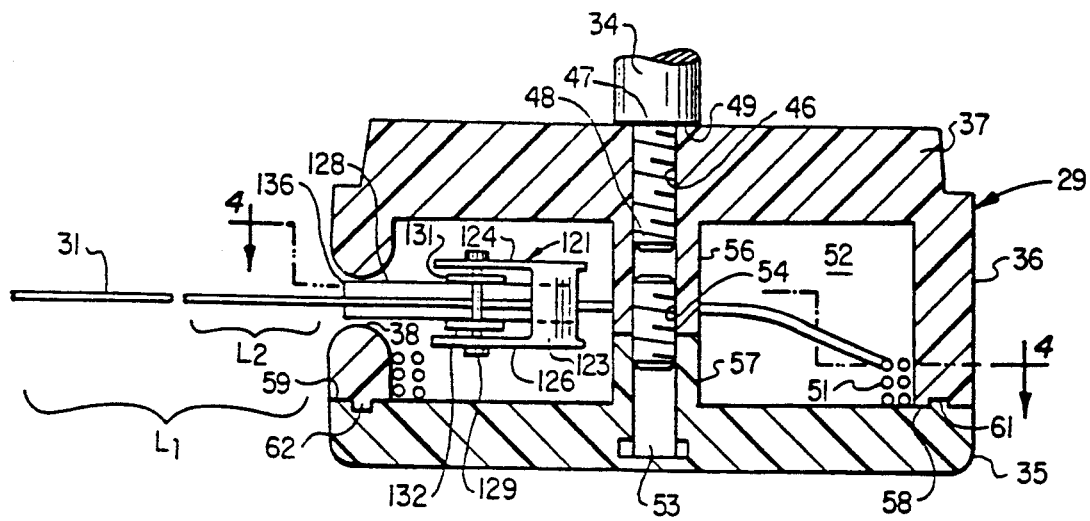
FIG. 3 is a vertical section, in enlargement, through the cutting head shown in FIG. 2 for one embodiment of the present apparatus.
Figure 4:
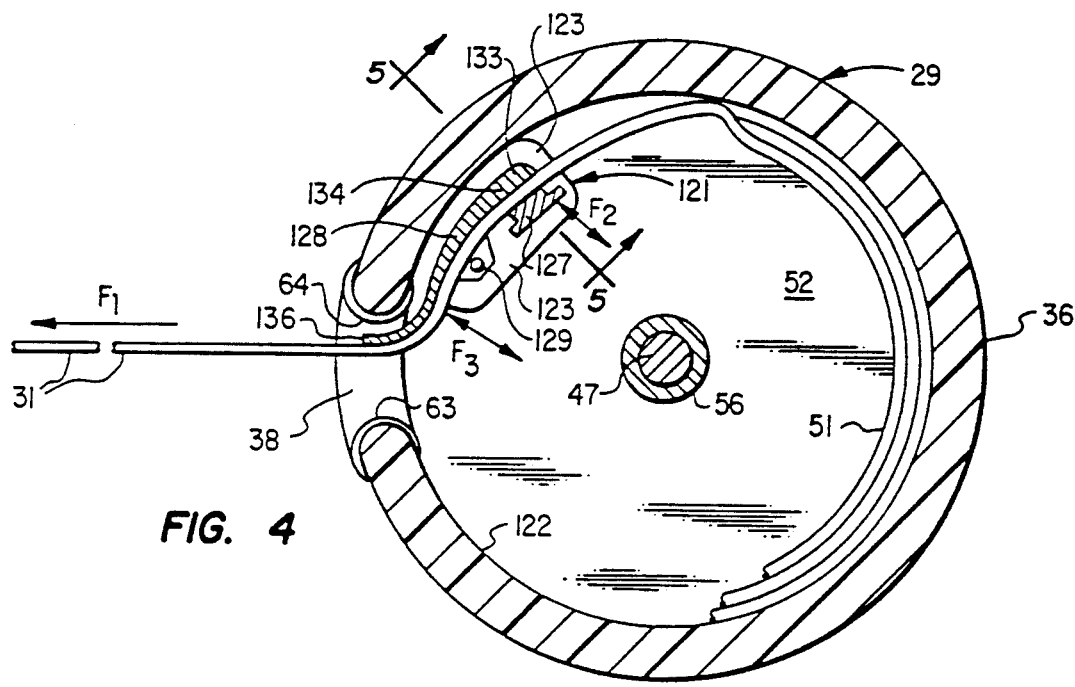
FIG. 4 is a cross sectional view taken substantially along lines 4—4 through the cutting head shown in FIG. 3.
Figure 5:
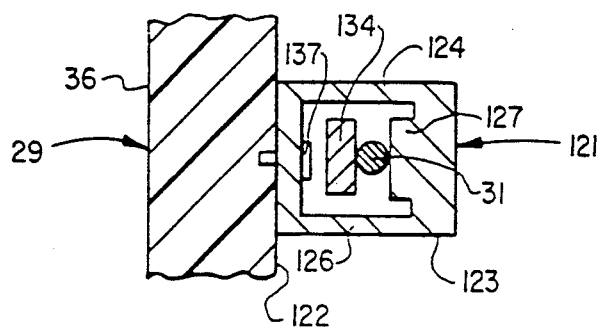
FIG. 5 is a partial enlarged vertical section, taken along lines 5—5 of the cutting head shown in FIG. 4.
Figure 9:
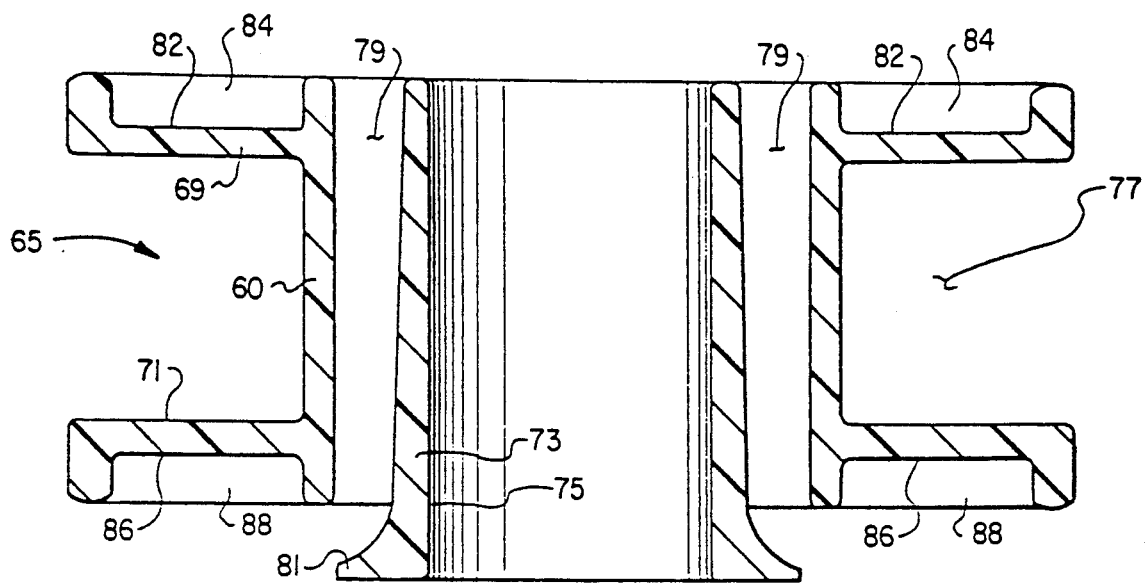
FIG. 9 is a sectional view taken along the axis of the spool structure of the head of FIG. 6.

The head 29, as best seen in FIGS. 3, 4 and 5, is disc-like with a smooth peripheral side surface carrying the aperture 38 through which the cutting line 31 extends into the cutting plane. On one face the hub 36 carries integral adapter threads 46 in which the drive shaft 34 is secured by its threads 47. In addition, the adapter threads 46 extend axially a sufficient dimension in the head 29 to form a rigid and integral connection with the shaft 34. Preferably, the shaft 34 is cylindrical with a flat circular radial shoulder 49 above its lower terminus 48.

The hub 36 in cooperation with a cover 35 forms a cylindrical enclosed cavity 52. A supply 51 of coiled cutting line is disposed within the cavity 52 in which it is free for independent rotational and axial movements within the head 29. If desired, the coiled cutting line can be carried on a spool mounted for rotation with the head.

The cover 35 carries integrally a stud 53 which is received within a threaded axial opening 54 on the hub 36. The hub and cover have meeting surfaces provided by posts 56 and 57, and annular abutting planar surfaces 58 and 59, respectively. One or more recesses 61 and pins 62 provide for angular alignment between the hub and cover. The cover is unthreaded for access to the cavity 52, preferably counterdirectionally to head rotation.

The opposite end of the coiled cutting line interior of the head is not secured to the hub 36. The free end of the cutting line 31 extends outwardly of the head 29 through the aperture 38. Preferably, the coiled cutting line supply 51 is wound counterdirectionally to the rotation of the head during vegetation cutting. This coiled line winding arrangement avoids backlash problems and unintended uncoiling of cutting line when rotation of the head is suddenly reduced or interrupted.

The exposed surfaces of the head 29 should be smooth in surface contour, rounded at the edges and without substantial projections and recesses capable of trapping appreciable vegetation. Preferably, the cover 35 has a smooth exposed surface, is circular in configuration with rounded corners, and is positioned coaxially aligned with the axis of rotation of the head 29.

The aperture 38 for purposes of this embodiment has curved leading and trailing edges which encounter the cutting line 31 during head rotation. Preferably the leading and trailing edges carry smooth bearing surfaces 63 and 64, respectively. The surfaces 63 and 64 are removable as shown, but could be made integral with the hub 36.

Referring now to FIGS. 3-5, there is shown a first embodiment of the present invention utilizing a relatively simple and easily constructed line feed control which may be mounted into any type of an existing head arrangement. Comprising the construction of this embodiment is a balance mass actuator, generally designated 121, that is operative to control line 31 in opposition to the pull out forces being imposed on the line wanting to draw the line outward of aperture 38 beyond the established length $L_1$. The actuator 121 is formed of a unitary or modular construction which can be readily secured via a screw or self tapping pin 137 to the inner wall 122 of the head 29.

Forming the actuator 121 is a base member 123 which carries top and bottom flanges 124 and 126. The base member 123 also carries a fixed jaw 127 which extends vertically between the flanges and for a short lateral distance along the base member. A lever 128 is pivotedly mounted by a pin 129 between upper and lower ears 131 and 132 to the base member 123. The lever at its inward end 133 carries a jaw 134 which is adapted to cooperate with the jaw 127 for gripping or pinching the line 31 to control its extension feed out from the rotating head. The lever 128 has a free end 136 terminating inwardly of the aperture 38. The end 136 is formed with a curved surface bent radially outward to support the cutting line 31 during cutting operations and prevent it from being injured or broken when encountering a solid unyielding object. Preferably, the lever 128 is of a metal such as brass or steel and may be formed by investment casting.

It can be appreciated that the lever 128 is provided with controlled mass distribution at its ends 133 and 136 to produce a balancing of the respective forces $F_1$, $F_2$ and $F_3$. When the cutting line 31 is at its established predetermined maximum extension $L_1$ from the head 29, the force $F_3$ is sufficient to move the pivoted lever 128 clockwise (FIG. 4) about the axis of pin 129 so that the jaw 134 moves toward the jaw 127 with sufficient force to pinch or engage the cutting line and hold it securely against extension from the rotating head. As the cutting line is decreased to length $L_2$ through wear or for other reasons, the mass of distribution of the lever 128 is such that the force $F_3$ remains relatively constant while the force $F_2$ in opposition to force $F_1$ tends to open the jaws 127 and 134 sufficiently to permit the cutting line to slide through the jaws and outward of the aperture from the head.

In operation, prior to startup, a pull on the free end of the line 31 will be resisted by friction on the coil of line within the head 29, and since there is no centrifugal force tending to pivot the arm 128 in the opposite direction, this tension force will be applied to the arm 128 which will pivot the jaws together to grip the line. The harder the line pull, the greater the gripping force, so that the line is locked against further extension. As the head is brought up to speed, the centrifugal force on the free end of the line and that on the imbalanced arm 128 increase in the same manner, while the friction force on the line within the head also tends to increase as the line is pressed outwardly against the walls of the head. If the centrifugal force on the free end of the line is greater than the reference force produced by the imbalanced arm, indicating that the line is at least as long as desired, the line is locked in place. If the centrifugal force of the line, i.e., the line tension, acting on the end of the lever arm is less than that produced by the mass imbalance, the grip on the line will be reduced and the line will slide between the jaws. The friction on the line within the system provides adequate force to maintain the sliding contact, which, in turn, provides additional back tension on the line so that the tension in the line will be adequate to act on the arm and to lock up the line when the desired length of the free end is again attained.

The level of friction generated by the jaws can be changed by changing the position of the pivot point relative to the end 136 of the arm 128 which senses the tension in the line produced by centrifugal force and the line gripping jaws. Maintaining a reliable and adequate back tension on the line during all modes of operation to ensure that the line is payed out in a controlled manner is very important for satisfactory operation. By controlled manner, it is meant that the payout is not free wheeling but is such that a back tension equal to the centrifual force generated on the line is maintained either constantly or at short intervals of line payout so that the pivot arm can sense the line tension and stop payout at the desired length. Unless the line is under this type of control, the line tension cannot be sensed and once the line is released, it will continue to payout. The following embodiments of this invention are directed toward providing improved means for providing controlled payout under all modes of operation.

For an understanding of the second embodiment of the apparatus hereof, reference is made initially to FIGS. 6, 7 and 8 in which the head 29 is threadedly secured as before to motor drive shaft 34. The hub 36 is adapted to interfit with a cover 35 by means of spring locking tabs 39 on the hub and complementary grooves (not illustrated) on the cover. An arbor 40 is axially threaded to receive stud 47 from the drive shaft 34 and is secured within the head between downwardly depending tubular cap post 56 in hub 36, and a shoulder formed on the arbor 40. The cover 35 has an annular lip 45 which receives the lower end of the arbor for stability. A line spool indicated generally by the reference numeral 65 contains a storage supply of cutting line 31 and is rotatably and reciprocably supported on arbor 40.

Figure 12:
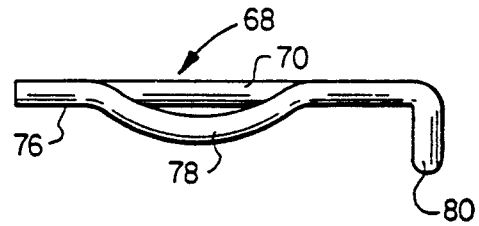
FIG. 12 is a right side view of the balancing arm of FIG. 11.
Figure 11:
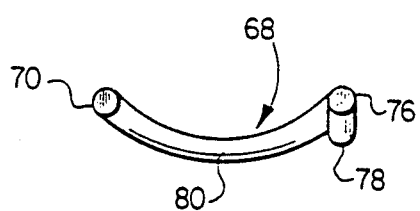
FIG. 11 is a bottom view of the balancing arm of FIGS. 6 and 7.
Figure 13:
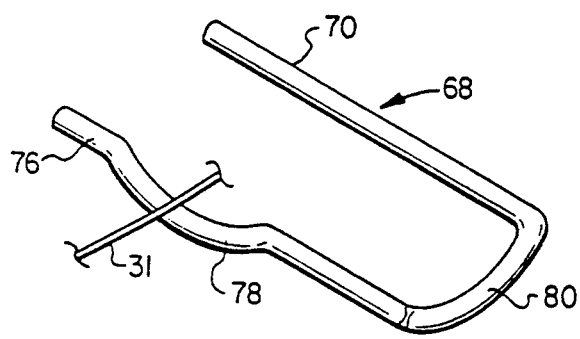
FIG. 13 is an isometric elevation of the balancing arm of FIG. 11.

This embodiment achieves improved stability of operation under all conditions by ensuring that the line payout is at a controlled rate. This is achieved by what may be termed an inertial angular velocity governor which constitutes an important aspect of this invention. The governor maintains tension in the line 31 as it passes over a balance arm 68 to ensure that the tension in the line can be sensed by the balance arm. The balance arm 68, as best seen in FIGS. 11-13, may be comprised of stiff wire, such as music wire of about 0.100 inch diameter, bent into a more or less U-shape configuration. The arm is formed into an upstanding straight leg 70 and an opposite, generally parallel leg 76. Leg 70 is pivotally received in a sleeve 72 (FIG. 6) which, in turn, is friction fit in a vertical pocket 74 of the molded plastic hub 36. The opposite leg 76 includes an intermediate offset or bow 78 over which line 31 is routed from spool 65 to a line aperture 38. An arcuate section 80 interconnects the two vertical legs at the upper ends and is used to prevent reciprocation of the spool as hereafter described by becoming interposed between the hub and spool. As the head is rotated, centrifugal force will tend to urge the arm counterclockwise from the position shown in dotted outline in FIG. 6 (see FIG. 8 also), hereafter referred to as the line locked position, to the position which is shown in FIG. 6 in solid outline, hereinafter referred to as the released position (see FIG. 7 also). Countering the centrifugal force will be the force $F_3$, which is a vector function of the tension imposed on line 31 that is transmitted to leg offset 78 and which tends to urge arm 68 from the unlocked position to the locked position.

Spool 65, as will be described with specific reference to FIGS. 6-10, is comprised of a tubular sleeve 73 having a central bore 75 adapted to be rotationally and reciprocably supported in a freely movable fit about arbor 40. The lower distal end of the sleeve 73 is enlarged to define a spool extraction knob 81 which permits a user to conveniently remove the spool from the head for servicing. Joined to the sleeve is a drum 60 that includes annular concentric flanges 69 and 71 between which is formed an intervening cavity 77 for containment of a wound supply of coiled line 31. Formed in the top surface of flange 69 is a plurality of uniformly spaced chamfered recesses 82 (see FIGS. 7 and 14-16A) which form intermediate each adjacent pair of recesses a slope sided tooth cam 84. Similarly formed in the underside of flange 71 are a plurality of similar recesses 86 defining intervening slope sided cam teeth 88 which are in a registered alignment with the upper cam teeth 84. Generally separating the sleeve 73 from the drum 60 (FIGS. 6 and 9) are a plurality of arcuate axially extending recesses 79. Line 31 on drum 60 extends through peripheral hub cavity 89 for routing about the offset 78 of balancing arm 68 and their outwardly through aperture 38.

Spaced apart chamfered recesses 82, 86 and intervening slope sided cam teeth 84, 88 respectively of spool 65 are positioned to cooperate with recesses 90 (see FIGS. 14-16A) between cam teeth 92 formed on the underface interior of hub 36 and recesses 94 between cam teeth 96 formed on the inside surface of cover 35. While cam teeth 84 and 88 of the spool are intended to be aligned as previously mentioned, cam teeth 92 and 96 of the cover and hub respectively are intended to be relatively misaligned to effect axial reciprocation of the spool as will presently be described. The alignment and misalignment arrangement of the cam teeth could in the alternative be reversed or utilized in a combination thereof.

Figure 10:
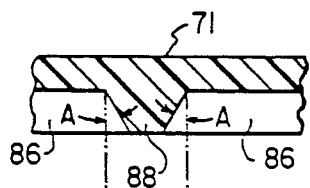
FIG. 10 is a sectional view taken of a lower spool tooth cam of the device of FIG. 6 taken along line 10—10 thereof.

For understanding operation of the inertial angular velocity governor 66, it should be noticed in FIG. 10 that the profile of the cam teeth are symmetrically formed at a slope angle "A" so that lockup between cam teeth cannot occur in the course of engagement and disengagement. The angle "A" may for example be about 30 degrees which ensures a sliding condition between teeth in contact so that the opposing cam teeth will bias the spool axially alternatively upwardly and downwardly in sliding relationship. The sequence by which the opposing cam teeth engage and disengage can be best understood by following the repetitive sequence of operations schematically depicted in FIGS. 14-16A as subsequently described. It will be presumed for purposes of discussion that cover 35 and hub 36 are rotating in the direction of arrow 98 and that the spool 65 is rotated by tension in the line 31 (during line payout) in a direction represented by arrow 100. As the spool 65 is urged by line tension resulting from centrifugal force to rotate in the direction 100, the upper and lower spool cam teeth 84 and 88 will alternatively operate between the opposing misaligned cam teeth 92 and 96 of hub and cover respectively, causing the spool to reciprocate axially.

The balancing arm 68 (FIG. 6) forms an imbalanced reference mass which is subject to the centrifugal force $F_2$ due to rotation which tends to cause a pivotal movement of the arm counterclockwise from the locked position shown in dotted outline in FIG. 6 to the unlocked position shown in solid outline. The counter force vector $F_3$ resulting from tension in the line 31 acts on arm 68 in a direction tending to pivot the arm clockwise from the unlocked position to the locked position. When the balance arm is in the locked position, the portion 80 of the arm is between the upper flange 69 of spool 65 and the hub 36 as shown in FIG. 8 and the spool cannot move upwardly and is locked by the interacting lower cam teeth 88 on the spool and the cam teeth 96 in the cover 35. When line is to be payed out, the centrifugal reference force $F_2$ produced by the imbalance reference mass of the pivoted arm 68 overcomes the counter force $F_3$ of the line acting on the arm 68 and the arm is pivoted outwardly beyond the circumference of upper spool flange 69, enabling vertical reciprocation of the spool and thus rotation of the spool to permit it to precisely and inertially control and retard line payout.

Figure 14:
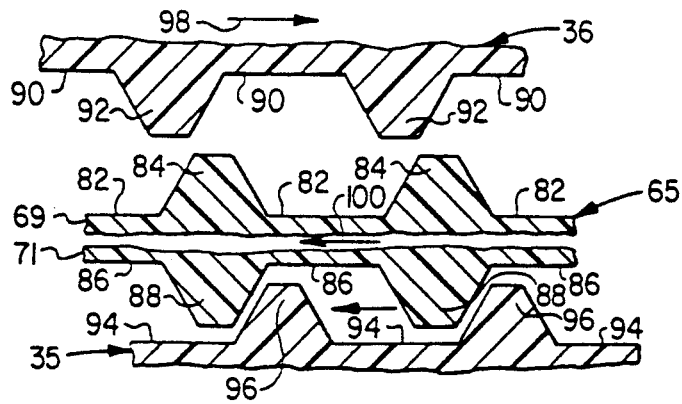
FIGS. 14–16A are schematic representations of the sequential steps of operation of the tooth cams of the inertial brake of the present apparatus with the line spool being axially foreshortened for illustrative purposes.
Figure 15:
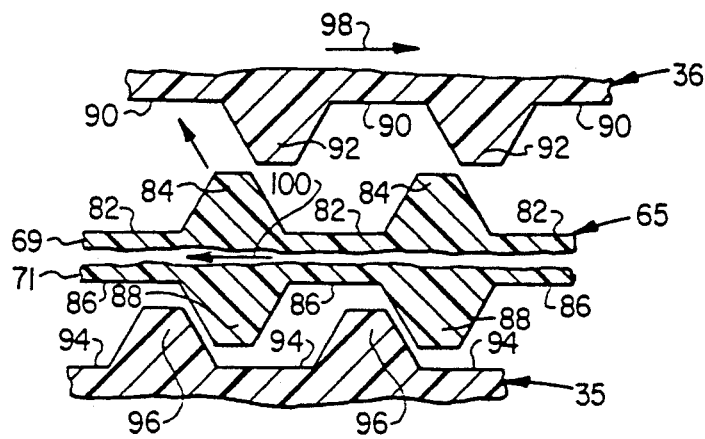
Figure 16:
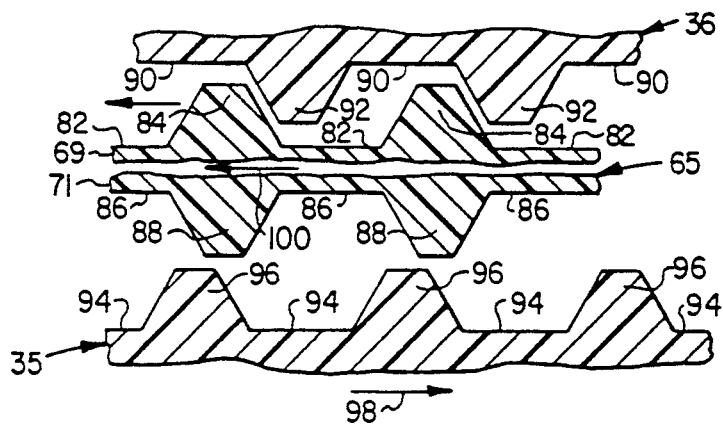
Figure 16A:
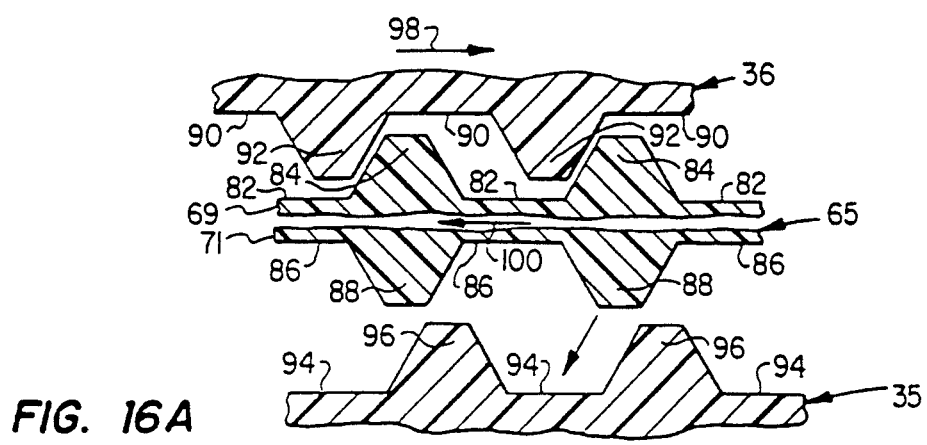

Beginning with the spool arrangement of FIG. 14, in which arm 68 is presumed to be in the unlocked position, the lower spool cam teeth 88 are bottomed out in cover recesses 94 for incremental rotation in the direction 100 until engagement with the next successive cam teeth 96 of the cover 35. As shown in FIG. 15, the cam teeth 88 will then slide upwardly along the mating sloping faces of cam teeth 96 until clear of cam teeth 96. As the spool reciprocates upwardly toward its position in FIG. 16, upper spool cam teeth 84 penetrate hub recesses 90 until cam teeth 88 have cleared cam teeth 96. By that time cam teeth 84 have rotationally advanced incrementally to the next succeeding cam teeth 92 on the hub 36 (FIG. 16A). This sequence is repetitive as the cam teeth of spool 65 sequentially advance, engage and slide vertically. Consequently, as each spool cam tooth bottoms out and is arcuately displaced in the opposing hub or cover recess, the subsequent sliding displacement between mutually engaging cam teeth forces the spool in the opposite axially direction. The friction between the sliding cam teeth to some extent, but far more importantly, the energy required to accelerate the spool reciprocally along the axis ensures that a back force is maintained on the line at all times, and the greater the line pull, the greater the force required to axially accelerate the spool, and the greater the back tension. This ensures that the tension in the line during payout is equal to that resulting from the centrifugal force on the line, at least on a high frequency, intermittent tension, so that this force producing tension in the line can be balanced against the centrifugal force action on the reference mass of the pivoted balanced arm.

For an understanding of the forces involved by which the spool 65 is activated and deactivated in the aforesaid manner, attention is again directed to FIG. 6 from which it will be appreciated that the tension force $F_1$ is that resulting from centrifugal force on the line 31 which is maintained by the fact that the spool is either secured against rotation, or retarded during line payout by the inertial and frictional effects produced by the interacting cam teeth. The force $F_4$ represents the net difference between the vector force $F_3$ of the tension in line 31 and the centrifugal reference force $F_2$ on the reference mass of arm 68. In the relationship illustrated in FIG. 6, line 31 outward of aperture 38 is assumed to be at the predetermined maintained length $L_1$ such that for purposes of discussion, the tension counter force $F_3$ of line 31 being imposed on arm 68 exceeds the centrifugal force $F_2$ on the arm so that the net force $F_4$ is leftwardly directed as viewed in FIG. 6. The arm 68 is therefore in locked position to prevent reciprocation and therefore a rotation of the spool so that the spool 64 is locked to prevent payout of the line.

As the outwardly extended length of line 31 begins to wear, or should breakage of the line occur, the centrifugal payout force $F_1$ on the line 31 and therefore the counter force $F_3$ from the line will be reduced until the centrifugal reference force $F_2$ on the arm 68 overbalances the counter force $F_3$ of the line at which point the next force $F_4$ becomes rightwardly directed as viewed in FIG. 6 and the arm will pivot outwardly to release the spool. The spool is then accelerated axially first upwardly, then downwardly while maintaining a resistive drag or back tension force on the line. A particularly significant high back tension force is produced when successive cam teeth are engaged after short rotation and at the start of axial acceleration. This ensures that if the outwardly projecting line length is such as to cause the force $F_3$ to overbalance the centrifugal force $F_2$ on the arm, the arm will in fact be pivoted inwardly and again lock the spool to prevent further payout of the line. If not, the spool will continue to reciprocate, rotate and pay out line until the force $F_3$ of the line 31 moves the balance arm 68 to its inward locking position.

It is significant to note that the payout of the line 31 is essentially independent of the rotational speed of the head because any increase in centrifugal payout force $F_1$ on the line 31 due to a speed increase is counterbalanced by a corresponding increase in centrifugal reference force $F_2$ acting on the reference mass of the balance arm 68. Thus the device functions well on a unit driven by a gasoline engine, which due to rich fuel, fouled spark plugs or the like, may vary over a significant r.p.m. range, yet which does not tend to change r.p.m. due to line loss. Yet the device also functions on an electric powered unit where r.p.m. may increase substantially as the line 31 shortens. It is also important to notice that line 31 cannot payout while the head is stationary, because only rotation of the head causes the balance arm 68 to unlock the spool 65. Further, should the line 31 snag on a chain link fence or the like, the excessive force will always overcome the centrifugal force on the balance arm 68 and insure that the spool is locked against rotation.

Figure 17:
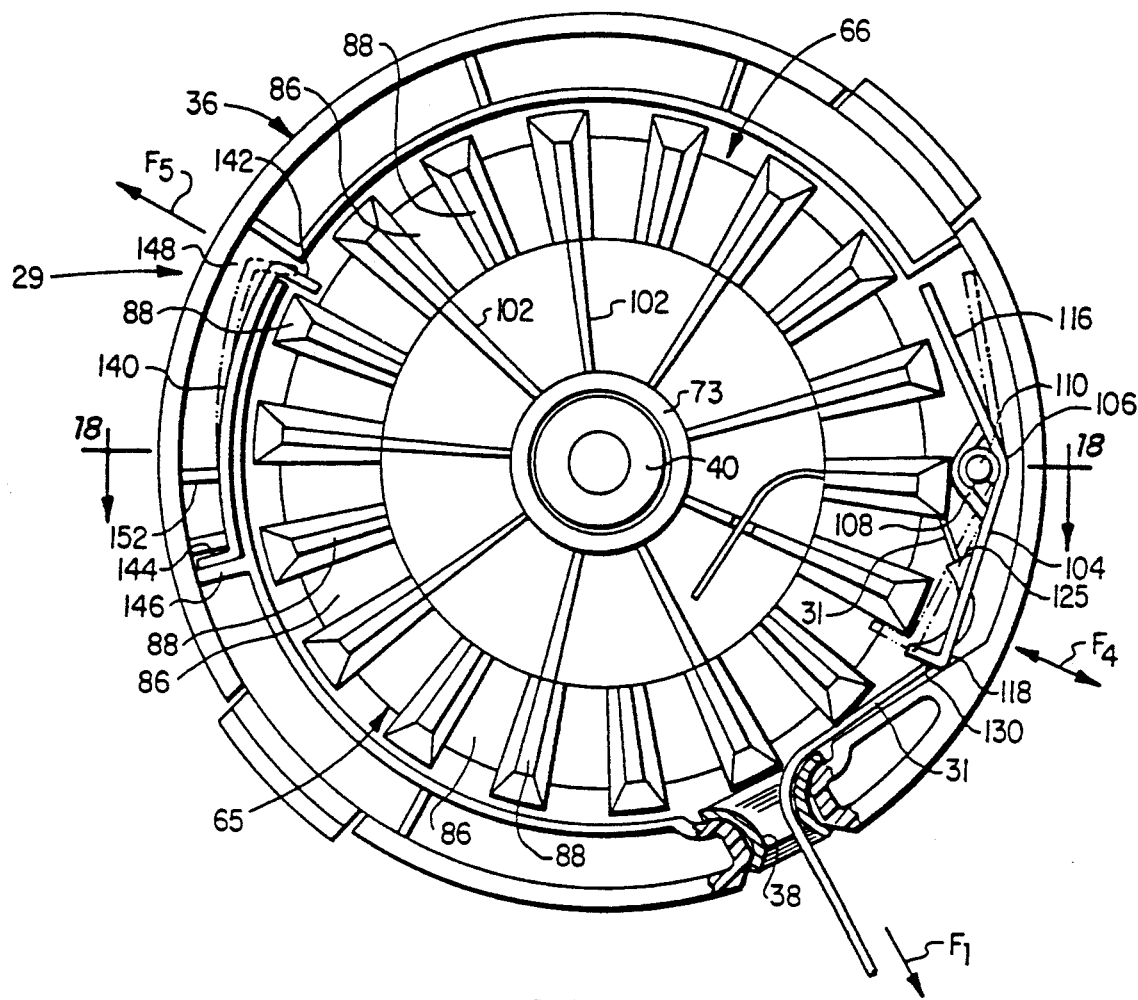
FIG. 17 is a bottom view of another cutting head embodiment of the present invention, with its lower cover portion removed and a lower circumferential portion of the hub being broken away for illustrative purposes.
Figure 18:
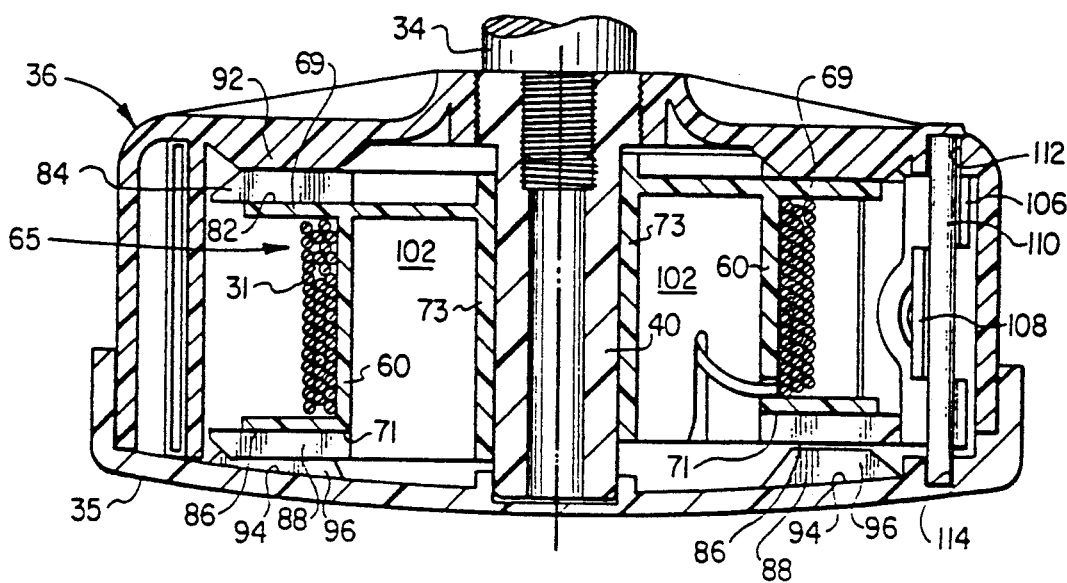
FIG. 18 is a sectional view taken along line 18—18 of FIG. 17 with the lower cutting head cover replaced.
Figure 19:
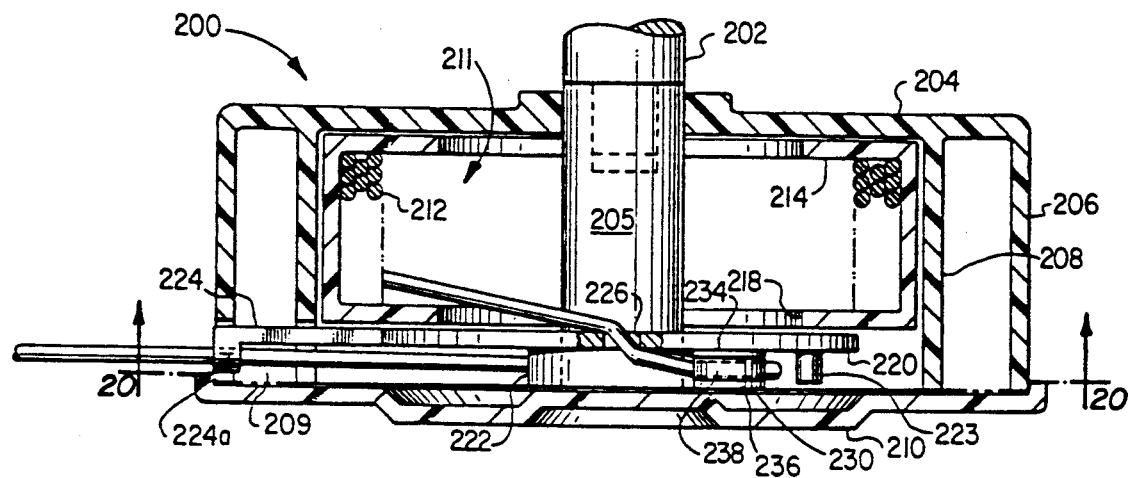
FIG. 19 is a sectional view of another embodiment of the cutting head in accordance with the present invention.

Another embodiment of the present invention is illustrated in FIGS. 17 and 18. This embodiment is substantially the same as the embodiment just described, except that a balance beam 104 engages locking teeth on the periphery of the spool to lock and unlock rotation of the spool. For ease of illustration, the spool 65 in FIG. 18 is split along the axis and shown on the left side of the rotational axis in the lower reciprocal position of the spool with cam teeth 84 disengaged from hub cam teeth 92 while lower cam teeth 88 are engaged with the cover cam teeth 96 of cover 35. In contrast, the device on the right side of the rotational axis is shown with the cam teeth 84 in mesh with the hub cam teeth 92 while the lower cam teeth 88 are disengaged from the cover 35 cam teeth 96.

For this embodiment, the head 29 is similarly connected as before to the drive shaft 34 of the motor 33. Spool 65 likewise includes a drum 60 about which the line 31 is coiled between the flanges 69 and 71. The inertial drag brake 66 is produced by cam teeth 84 upstanding from the flange 69 and uniformly spaced thereabout with intervening arcuate spaces 82. The cam teeth 84 and 88 in this embodiment, rather than the recesses, are chamfered whereas the intervening recess as formed between adjacent cam teeth are unchamfered in contrast to the previous embodiment. Similarly, flange 69 includes the spacings 86 and cam teeth 88 aligned with cam teeth 84 for engaging the spacing 94 and cam teeth 96 in the cover 35. The sleeve 73 is connected to the drum 60 via a plurality of spokes 102.

The actuator for activating and deactivating the material drag brake in this embodiment is a stamped metal balance beam 104 centrally bent at 106 at an obtuse angle and split at 108 (FIG. 17) for mounting on a pivot shaft 110. The shaft 110 is supported within aligned recessed pockets 112 and 114 of the hub and cover respectively. The balance beam 104 includes a lighter weight first section 116 and a relatively heavier weighted second section 118 so that a net reference mass imbalance tends to cause the balance beam 104 to pivot in a counterclockwise direction when referring to FIG. 17 when the head is rotated. The second section 118 includes an inwardly protruding end 130 which engages locking teeth (defined by radially outer end portions of the spool cam teeth) protruding from the periphery of the spool and serves to lock the spool against rotation. The line 31 extends from the spool 65 through an aperture 125 then over a smoothly curved section leading the line over the end of the balance beam 104 before emerging from aperture 38 as before so that the tension in line 31 due to centrifugal forces of rotation produces a vector force component tending to pivot the balancing beam 104 clockwise about the axis of shaft 110 counter to the centrifugal force on the reference mass imbalance of the balance beam 104.

An elongated leaf spring 140 is offset oppositely at its ends 142 and 144 and is included herewith as an optional feature. The spring 140 is positioned on the opposite side of the head from the balance beam 104 to provide balance to the head. The leaf spring is secured via its end 144 in a pocket 146 of the hub 36 from where it extends past a post 152 in a cavity 148 before end 142 toes inwardly past the edge of a tooth 84. In this relation the leaf spring 140 serves to lock the spool at relatively low RPMs until centrifugal force overcomes the spring force and releases the spool. Low RPM can occur after partial entanglement of the line during operation or at startup until a minimum RPM is exceeded. The spring 140 provides a two-step startup operation thereby avoiding the possibility of any erratic line feed behavior during either line entanglement or startup.

In operation, actuation of balance beam 104 is very much analogous to the balance arm 68 described above. Since the balance beam 104 is relatively weighted in the section 118 as compared to the section 116, it is pivoted between the inner locking position and the outer release position in response to the net balance force $F_4$. As above, the component forces comprising force $F_4$ are represented by the centrifugal force causing the balance beam 104 to pivot counterclockwise about pivot 110 which is opposed by the vector force component of the tension in line 31 resulting from centrifugal force $F_1$ urging clockwise rotation. During such time as line 31 is at the predetermined length, the balance beam 104 is in the locked position whereby the distal toed end 130 is in a position to engage a spool locking tooth 84 to prevent rotation of the spool. At such time as a line feedout is to be effected to restore the line length, the forces rotate the balance beam 104 counterclockwise and release spool 64. The inertial payout governor or drag brake then operates in the manner described in connection with FIGS. 14–16 to effect a controlled payout of the line 31. As soon as line length restoration has been achieved, the forces acting on the balance beam 104 are such as to cause the balance beam 104 to pivot clockwise to the inward locking position where the toe 130 engages either upper or lower locking teeth 84 or 88 to arrest further rotation of the spool 65.

Spring 140 which is subject to a bending moment about post 152 in response to the centrifugal forces $F_5$ imposed on the distal end 142 is utilized to prohibit rotation of the spool unless the head 29 is rotating above a minimum r.p.m. The properties of spring 140 are selected so as to enable a release of the spool 65 when the rotational velocity of the head 29 exceeds a predetermined magnitude so that payout under reduced speed conditions is positively precluded. As already noted, the use of spring 140 is optional and primarily provides a backup in the event of any shock force imposed on the exposed line 31 by which payout could begin before arrest of the spool could be properly effected by means of the balance beam 104. In this arrangement therefore, the distal spring end 142 in response to the rotational forces at $F_5$ will be in the position shown solid in FIG. 16 to intervene in the space 82 between locking teeth 84 and arrest operation of the spool 64 at predetermined reduced speeds thereof. When the set speed is exceeded the leaf spring 140 is bent outwardly to the position shown in phantom at which time the balance beam 104 governs activating and deactivating the inertially retarded rotation of the spool 64.

Another embodiment of the automatic cutting head in accordance with the present invention is indicated generally by the reference numeral 200 in FIGS. 19–23. The cutting head 200 is driven by a shaft 202 which, in turn, is driven by a suitable prime mover such as an electric motor or gasoline engine, neither of which is illustrated. The head 200 comprises an upper housing portion 204 which is generally an inverted cup-shape and which includes an arbor 205 which is threaded onto the shaft 202. The housing 204 has outer and inner cylindrical shells 206 and 208. A lower housing half 210 forms a cap which is secured to the outer cylindrical shell 206 by any suitable manner so as to be conveniently removed to permit access to the interior of the head. The housing 204 forms a supply cavity 211 for a coiled supply of monofilament cutting line 212 which may conveniently be retained within a bobbin-type spool 214. The bobbin-type spool 214 is sized smaller than the interior cylindrical portion 208 of the upper housing section so as to turn freely therein. The supply of cutting line 212 is drawn from the middle of the coil through a central opening 218 in the bobbin spool 214 as will presently be described in greater detail. The three elements upper housing 204, lower housing 210 and bobbin-type spool 214 may conveniently be formed of molded plastic material.

Figure 20:
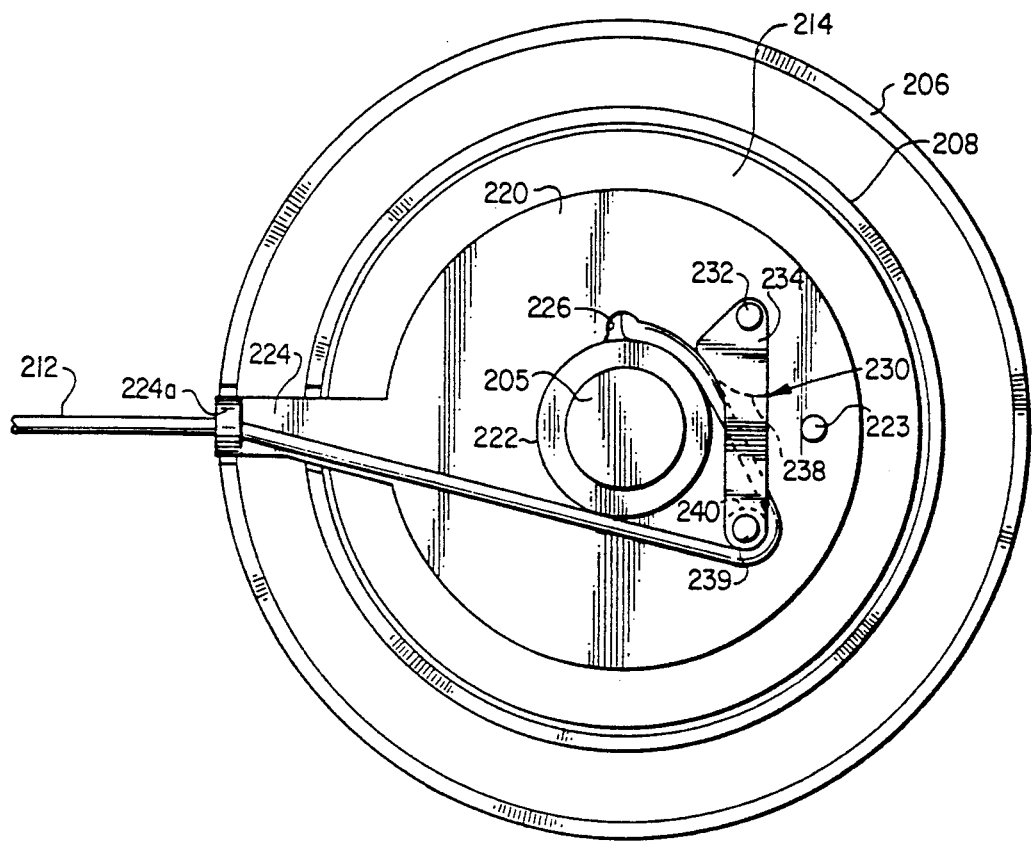
FIG. 20 is a cross-sectional view through the cutting head shown in FIG. 19 taken along line 20—20 of FIG. 19.

A metallic plate 220 has a central boss 222 which is fitted over the drive shaft 202 and has an arm section 224, which can best be seen in the bottom plan view of FIG. 20, which extends through a line passage gap 209 formed in the side walls 206 and 208. An eyelet 224a is formed at the end of the arm 224 to provide a positive guide for the cutting line 212 as will presently be described. An aperture 226 is formed in the plate 220 adjacent the boss 222 so that cutting line 212 can be withdrawn from the interior of the supply coil within the bobbin spool 214, passed through the opening 226, passed in frictional sliding engagement around the back side of the boss 222 (FIGS. 19 and 20), then through a pivoted arm member 230 and around a roller 240 (FIG. 22), and finally through eyelet 224a.

Figure 23:
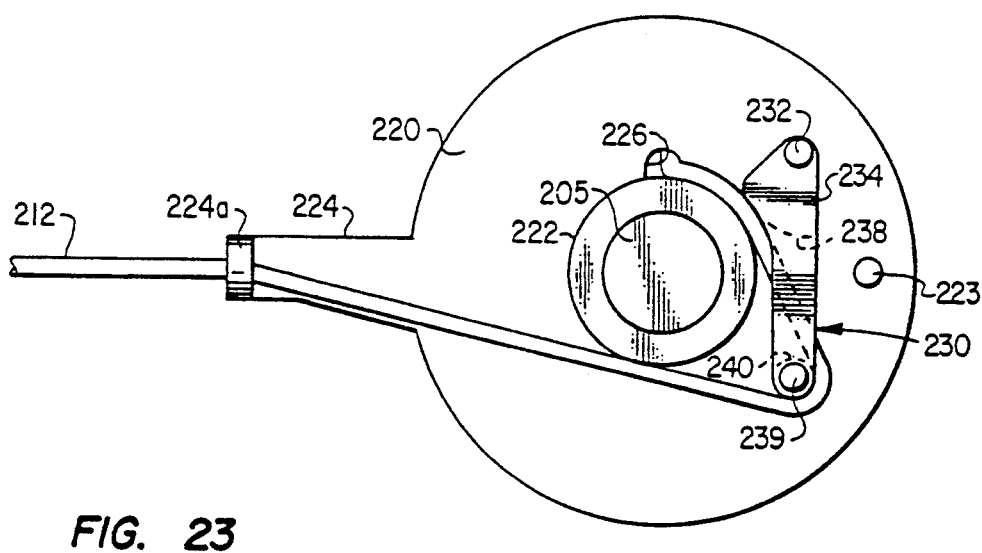
FIG. 23 is a view of the line payout mechanism of FIG. 21 with the balancing arm in a different position.

The arm member 230 is mounted on a pivot pin 232 which protrudes downwardly from the plate 220. The construction of the arm member 230 is best illustrated in FIGS. 22 and 23, and is comprised of parallel plates 234 and 236 which are separated by a spacer 238 at the pivoted end, and by a bearing post 239 for a roller 240 at the free end. The spacer 238 forms a cam surface which is spaced to progressively clamp the line 212 against the boss 222 as the arm 230 is pivoted in the clockwise direction, when referring to FIG. 21, with a wedge-like action to provide a substantial mechanical advantage and ultimately frictionally lock the line 212 against payout. This position is illustrated generally in FIGS. 20 and 23, and is hereafter referred to as the line locking position. When the arm 230 is pivoted counterclockwise to the position shown generally in FIG. 21, the surface of the spacer 238 is progressively moved away from the boss 222 to progressively release the grip on the line and permit the line to be slidably and controllably payed out as will presently be described.

Thus, the line 212 extends from the coil of line in the chamber 211, through the aperture 226, between the cam surface 238 and the boss 222, around the roller 240, and then through the eyelet 224a to a predetermined length therefrom. As the head is rotated at high r.p.m., the free end of the line 212 extending from the eyelet 224a is whirled in a cutting plane disposed substantially normal to the drive shaft 202. The diameter of the cutting disc is maintained at a predetermined desired diameter by automatically maintaining the length of the line as will presently be described.

Figure 21:
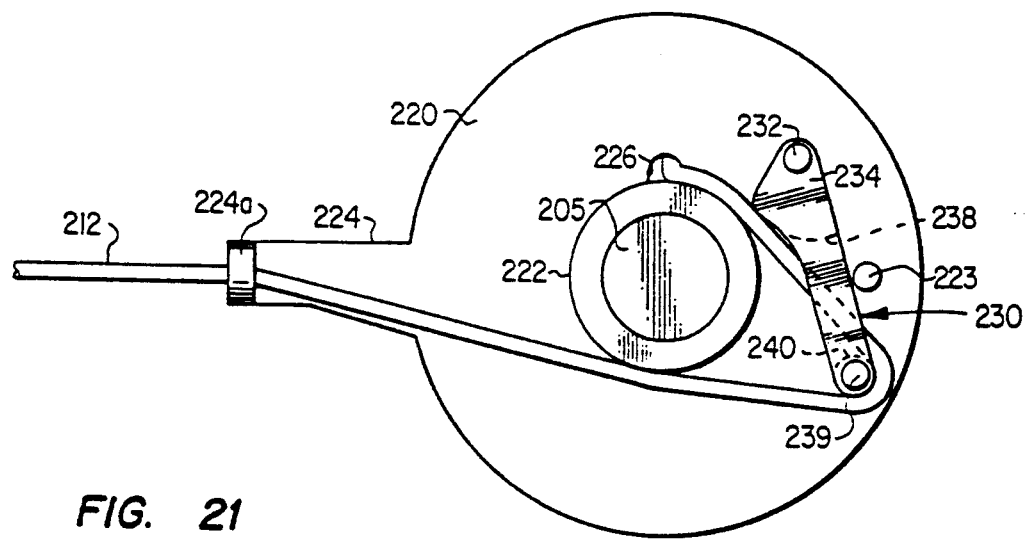
FIG. 21 is a bottom view of the line payout mechanism of the head of FIG. 20 which serves to illustrate operation of the device.
Figure 22:
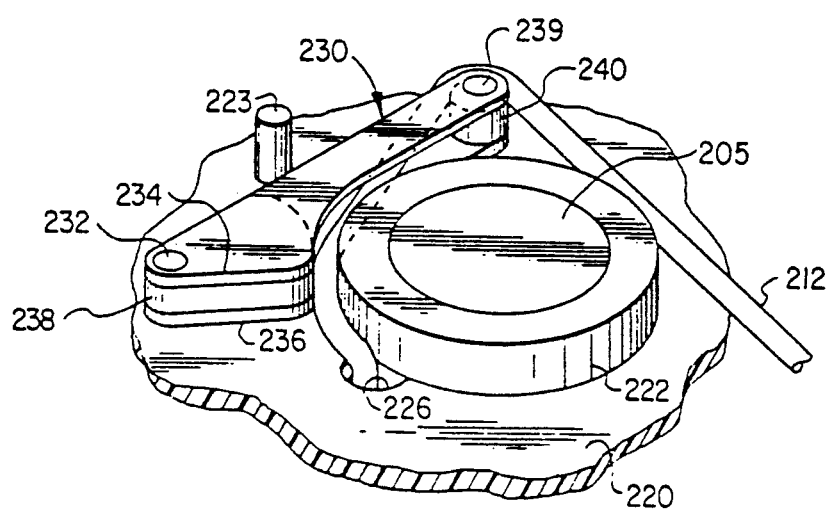
FIG. 22 is an isometric view of the actuator mechanism of FIGS. 20 and 21.

As previously described, the pivoted arm 230 has a mass imbalance about the pivot axis 232 which, when rotated, tends to cause the arm 230 to pivot outwardly in a counterclockwise direction when referring to the bottom view of FIG. 21. The tension in the line 212 resulting from centrifugal force produces a force vector on roller 240 tending to rotate the arm 230 in a clockwise direction. The tension in the line 212 is, of course, a function of the length of line extending into the cutting plane. When the length of line extending from the eyelet 224a is at the desired length, the force vector acting on the arm 230 is greater than the centrifugal force acting on the arm 230. As a result, the arm 230 is pivoted radially inwardly so that the cam surface 238 tightly grips or wedges against the line 212 to prevent further payout. Any additional force on the line 212, such as results from becoming entangled in a fence or other obstacle, merely enhances the clamping force to prevent further payout. It should also to be noted that as the arm 230 moves inwardly, the effective radius of the center of mass of the arm is decreased, so that the reference force tending to open the arm 230 also slightly decreases. This effects a positive, over center type clamping action on the line. When the line 212 is shortened due to wear or breakage to the extent that the centrifugal force on the reference mass is adequate to cause the arm 230 to pivot radially outwardly, the force clamping the line is reduced. As this begins to occur, the line begins to slip between the cam 238 and the boss 222, thus maintaining the back tension on the line necessary to create the vector force on roller 240 required to pivot the arm 230 back to the clamped position once the line has payed out to the desired length. Additionally, the capstan effect of the line 212 sliding around the boss 222 from the opening 226 to the pinch point between the cam surface 238 and the boss 222 provides a predetermined back tension which ensures that the tension in the line 212 can be effectively sensed by the arm 230. This back pressure tends to significantly increase as the line 212 attempts to payout at a greater rate, which constantly keeps the cam surface 238 dragging on the line 212 as it passes through the pinch point. The stop 223 limits travel of the arm 230 to a maximum open position sufficiently close to the line 212 as to maintain sliding contact with the boss 222 from the opening 226 to the pinch point, and thus assure the minimum back tension required on the line 212 to maintain the total back tension. In this connection, it will be noted that the bobbin-type spool 214 provides the lowest possible friction within the line supply cavity 211. Similarly, the roller 240 minimizes friction between the pinch point and the free end of the line 212. Thus, the back tension maintained on the line by the capstan effect of the boss 222 and the drag provided by the cam surface 238 is highly stabilized and predictable to achieve optimum operation.

From the above detailed description of several preferred embodiments of the present invention, it will be appreciated that a flexible line trimming device has been described which will automatically maintain a preselected length of cutting line, and therefore cutting diameter, during operation, without operator commands or attention. Although specific embodiments have been so described, it is to be understood that various changes, substitutions and alterations can be made therein without departing from the spirit and scope of the invention as defined by the appended claims.

What is claimed is:

1. For installation on a spool-supporting internal post in the cutting head housing of an automatic line feed type flexible line trimmer or the like, an inertial drag brake spool adapted to hold a coiled quantity of flexible cutting line and to cooperate with a portion of said cutting head housing to controllably retard automatic line feed outwardly from said housing, said spool comprising:

a central body portion having an opening extending therethrough along an axis and adapted to coaxially receive said internal post, an exterior side surface, and first and second opposite ends spaced apart along said axis;

a first flange secured to said first end of said central body portion and having axially outer and inner side surfaces;

a second flange secured to said second end of said central body portion and having axially outer and inner side surfaces, said axially inner side surfaces of said first and second flanges defining with said exterior side surface of said central body portion an annular cavity within which a length of flexible cutting line may be wrapped around and stored on said central body portion; and means, associated with said first and second flanges, for interacting with said portion of said cutting head housing during line payout in a manner causing the installed spool to simultaneously rotate and reciprocate on said internal post.

2. The spool of claim 1 further comprising:

a quantity of flexible cutting line disposed in said cavity and operatively wound around said central body portion.

3. For installation on a spool-supporting internal post in the cutting head housing of an automatic line feed type flexible line trimmer or the like, an inertial drag brake spool adapted to hold a coiled quantity of flexible cutting line and to cooperate with a portion of said cutting head housing to controllably retard automatic line feed outwardly from said housing, said spool comprising:

a central body portion having an opening extending therethrough along an axis and adapted to coaxially receive said internal post, an exterior side surface, and first and second opposite ends spaced apart along said axis;

a first flange secured to said first end of said central body portion and having axially outer and inner side surfaces;

a second flange secured to said second end of said central body portion and having axially outer and inner side surfaces;

said axially inner side surfaces of said first and second flanges defining with said exterior side surface of said central body portion an annular cavity within which a length of flexible cutting line may be wrapped around and stored on said central body portion;

means, associated with said first and second flanges, for interacting with said portion of said cutting head housing during line payout in a manner causing the installed spool to simultaneously rotate and reciprocate on said internal post, said means for interacting with said portion of said cutting head housing comprise;

a first circumferentially spaced series of teeth positioned on said axially outer side surface of said first flange; and a second circumferentially spaced series of teeth positioned on said axially outer side surface of said second flange.

4. The spool of claim 3 wherein:

said teeth in said first circumferentially spaced series thereof are circumferentially aligned with said teeth in said second circumferentially spaced series thereof.

5. The spool of claim 3 wherein:

the teeth in said first and second circumferentially spaced series thereof extend radially outwardly of the radial periphery of their associated flange.

6. For installation on a spool-supporting internal post in the cutting head housing of an automatic line feed typed flexible line trimmer or the like, an inertial drag brake spool adapted to hold a coiled quantity of flexible cutting line and to cooperate with a portion of said cutting head housing to controllably retard automatic line feed outwardly from said housing, said spool comprising:

a central body portion having an opening extending therethrough along an axis and adapted to coaxially receive said internal post, an exterior side surface, and first and second opposite ends spaced apart along said axis;

a first flange secured to said first end of said central body portion and having axially outer and inner side surfaces;

a second flange secured to said second end of said central body portion and having axially outer and inner side surfaces;

said axially inner side surfaces of said first and second flanges defining with said exterior side surface of said central body portion an annular cavity within which a length of flexible cutting line may be wrapped around and stored on said central body portion;

means, associated with said first and second flanges, for interacting with said portion of said cutting head housing during line payout in a manner causing the installed spool to simultaneously rotate and reciprocate on said internal post; and a spool extraction member secured to said central body portion and defining an axial extension thereof past one of said first and second flanges, said spool extraction member being configured to be easily grasped and pulled to facilitate removal of said spool from said internal post.

7. The spool of claim 6 wherein:

said spool extraction member has a tubular configuration, coaxially circumscribes said axis, and has an outwardly flared outer end portion.

* * * * *